UNITED STATES PATENT OFFICE.

HENRY S. SPACKMAN, OF ARDMORE, AND ELLIS W. LAZELL, OF PHILADELPHIA, PENNSYLVANIA, ASSIGNORS TO HENRY S. SPACKMAN ENGINEERING COMPANY, OF PHILADELPHIA, PENNSYLVANIA, A CORPORATION OF NEW JERSEY.

CEMENTITIOUS MATERIAL.

No. 903,020.   Specification of Letters Patent.   Patented Nov. 3, 1908.

Application filed September 22, 1908. Serial No. 454,140.

*To all whom it may concern:*

Be it known that we, HENRY S. SPACKMAN, a resident of Ardmore, Montgomery county, and State of Pennsylvania, and ELLIS W. LAZELL, a resident of the city and county of Philadelphia, State of Pennsylvania, citizens of the United States, have made certain new and useful Inventions Relating to Cementitious Materials, of which the following is a specification.

This invention relates to cementitious, that is to say, plastic materials or compositions, comprising plasters, hydraulic and other cements and relates more particularly to highly cementitious materials and to the preparation thereof by the incorporation of separately prepared calcium aluminate or similar accelerating material with independently cementitious material, such as mixtures comprising available lime or similar earthy alkali substance mixed or combined with coöperating natural non-pozzuolanic silicious material, such as fine grained high silica clays or shales or other argillacious or silicious material.

Hydraulic calcium aluminate compounds may be readily prepared by calcining suitable mixtures of finely ground lime and bauxite or other alumina compounds, such as kaolin or high alumina clays, high alumina slag and so forth, the materials being preferably combined in such proportions that from one to three molecules of lime are present to one molecule of alumina, sufficient lime being of course added to combine with the silica or other acid components which may be present in connection with the aluminous material added to form the mixture. Such mixed materials may be rendered hydraulic and given a very quick initial set when ground and mixed with water by calcining or sintering them, and if desired by subsequently fusing them in some cases which seems to give a slower initial set to aluminates containing approximately equivalent proportions of lime and alumina. It is of course understood that iron or similar material may be used in some cases to replace to some extent at least the alumina in this accelerating material, and that other earthy alkali material, such as magnesia and so forth, may be substituted for part at least of the lime combined therewith, such calcium aluminates and equivalent or substitute accelerating material being designated hydraulic earthy alkali accelerating compounds of alumina-like material. Suitable proportions of hydraulic calcium aluminate or similar accelerating material and also if desired controlling material to effect the desired quickness of set and increase of strength may be added and incorporated at any time before utilization with the independently cementitious material comprising oxids, hydrates or otherwise available lime or similarly acting earthy alkali material (that is, free or loosely combined lime, magnesia, baryta, strontia and other material capable of combining with coöperating silicious material and calcium aluminate accelerating material). The finely divided accelerating material may be added and incorporated by the workman before or after he gages the cementitious material, or it may be dissolved or incorporated in the gaging water; preferably however the accelerating and controlling material may be uniformly incorporated with the independently cementitious material so as to form a finely ground material convenient for transportation and utilization since it becomes immediately effective when the water is added thereto.

Many silicious clays, shales or other natural non-pozzuolanic silicious materials form, when incorporated with coöperating or available lime or the like and a suitable proportion of calcium aluminate or similar accelerator, valuable cementitious materials having sand strengths fulfilling or approaching the Portland cement requirements as well as having constant volume properties. Various proportions of such accelerating material may be incorporated with mixtures of slaked lime or its equivalent and such silicious clay or shale or other natural non-pozzuolanic material (preferably either fine grained or finely ground so that ninety-five per cent. or so pass a sieve having a hundred meshes to the linear inch) to secure the desired quickness of set and increase of strength, the percentage to be added depending of course on the chemical composition of the ingredients used, two to ten per cent. of calcium aluminate being usually sufficient to give compositions generally similar for making concrete and so forth to Portland or good natural cement and forming serviceable mortars for use with sand-lime bricks to which they have good adhesion; it not having been found necessary to add much over twenty per cent. to produce cements equal in strength when used with sand to Portland cements; although considerably larger proportions of the accelerator give much greater strength to the cement at early periods, the aluminate when gaged alone or after incorporation with small proportions of lime and coöperating silicious material giving strengths considerably in excess of Portland cement. A good illustrative composition for use as ordinary hydraulic cement may be secured by mixing approximately forty-five parts of hydrated lime, forty-five parts of natural shale or clay and ten parts of the calcium aluminate material, from one to three per cent. of plaster of paris being added to this mixture to control the rate of setting. The proportions of materials may be varied within a wide range without affecting materially the results and are of course subject to some modification for each special material.

Illustrative compositions suitable for use as hydraulic cements may be prepared from shale or clay having approximately either of the two compositions indicated in the two following analyses:

|  | No. 1. | No. 2. | Accelerator. |
| --- | --- | --- | --- |
| Silica (SiO$_2$) | 69.02% | 68.84% | 1.16% |
| Alumina (Al$_2$O$_3$) | 5.31 | 12.07 | 66.92 |
| Iron oxid (Fe$_2$O$_3$) | 2.35 | 7.17 | |
| Lime (CaO) | 6.22 | 1.16 | 31.46 |
| Magnesia (MgO) | 3.12 | 1.37 | .72 |
| Loss on ignition | 11.96 | 4.77 | .02 |

Forty-five parts of No. 1 were incorporated with three parts of plaster of paris, seven parts of hydraulic calcium aluminate accelerator having approximately the analysis indicated above, and forty-five parts of slaked lime having the following approximate analysis:

Silica (SiO$_2$) _ _ _ _ _ _ _ _ _ _ _ _ _ _ _ 1.02%
Alumina and iron oxid (R$_2$O$_3$) _ .42%
Calcium hydrate (Ca(OH$_2$)) _ _ _ 96.87

This material when the components were thoroughly incorporated by being ground together so that ninety-five per cent. passed through a 100-mesh sieve had, when gaged with water, an initial setting time of about two hours and was completely set in about four hours according to the indications of the standard Vicat needle. A sample of this hydraulic highly cementitious material, when tested at the twenty-eight day period in the ordinary way with three parts of commercial sand in water gave tensile strengths equal to those obtained from Portland cements, and the material passed the standard soundness or constancy of volume test in boiling water specified for Portland cement, indicating that it has cementitious properties similar to Portland cement. Another composition containing forty-five per cent. slaked lime, forty per cent. of argillaceous material No. 1, twelve per cent. of calcium aluminate and three per cent. of calcium sulfate, had an initial set of two hours and a final set of four hours, and gave when tested with three parts of sand in water 120 pounds at seven days and 307 pounds at twenty-eight days. Still larger amounts of the accelerator gave greater quickness of set and strength at early periods; a composition containing equal parts of slaked lime, calcium aluminate accelerator and such argillaceous material having an initial set of thirty-five minutes, a final set of one hour and fifteen minutes, and giving when tested with three parts of sand 170 pounds at one day and 230 pounds at seven days. Another illustrative composition formed by incorporating forty per cent. of argillaceous material No. 2, forty-five per cent. of slaked lime, twelve per cent. of calcium aluminate and three per cent. of calcium sulfate had an initial set of two hours and a final set of four hours, and had when tested with three parts of sand the following strengths; in air 106 pounds at seven days and 153 pounds at twenty-eight days, and in water 115 pounds at seven days and 307 pounds at twenty-eight days. Cement may be formed in this way from many argillaceous materials high in silica, it being understood of course that the hydraulic properties of many argillaceous materials for this purpose may be augmented by preliminary roasting. An illustrative composition was made by incorporating in finely divided condition fifty-five per cent. of slaked lime, ten per cent. of calcium aluminate accelerator and thirty-five per cent. of sandstone having approximately the following analysis:—

Silica (SiO$_2$) _ _ _ _ _ _ _ _ _ _ _ 90.34%
Alumina (Al$_2$O$_3$) _ _ _ _ _ _ _ _ 2.24
Iron oxid (Fe$_2$O$_3$) _ _ _ _ _ _ _ _ 3.28
Lime (CaO) _ _ _ _ _ _ _ _ _ _ _ _ .52
Magnesia (MgO) _ _ _ _ _ _ _ _ _ .46
Loss on ignition _ _ _ _ _ _ _ _ _ .94

This composition had an initial set of two hours and fifty minutes and a final set of eight hours, and gave when tested in water with three parts of sand 75 pounds at seven days and 153 pounds at twenty-eight days.

Having described the invention in this case which relates to natural non-pozzuolanic silicious compositions and which is a continuation of, that is, contains subject-matter taken from United States patent application 394,916, filed September 27, 1907 in connection with a number of illustrative ingredients, proportions, formulas and methods of preparation, to the details of which disclosure the invention is not of course to be limited, what is claimed as new and what is desired to be secured by Letters Patent is set forth in the appended claims.

1. The hydraulic highly cementitious material substantially fulfilling the constant volume and long-period sand strength requirements for Portland cement consisting of about equal proportions of slaked lime and coöperating natural argillaceous silicious material incorporated with a few per cent. of controlling material and between three and twenty per cent. of separately prepared hydraulic earthy alkali accelerating compounds rich in alumina-like material.

2. The hydraulic highly cementitious material substantially fulfilling the constant volume and sand strength requirements for Portland cement consisting substantially of about equal proportions of slaked lime and coöperating natural non-pozzuolanic silicious material incorporated with a few per cent. of calcium sulfate controlling material and between three and twenty per cent. of separately prepared hydraulic calcium aluminate accelerating material.

3. The highly cementitious material consisting of about equal proportions of available earthy alkali material and coöperating natural non-pozzuolanic silicious material incorporated with controlling material and between three and twenty per cent. of separately prepared hydraulic alumina calcium aluminate accelerating material.

4. The hydraulic highly cementitious material consisting substantially of about equal proportions of available lime and coöperating natural argillaceous silicious material incorporated with controlling material and between three and twenty per cent. of separately prepared hydraulic earthy alkali accelerating compounds rich in alumina-like material.

5. The highly cementitious material comprising substantially equal considerable proportions of slaked lime and coöperating natural argillaceous silicious material incorporated with between four and fifteen per cent. of separately prepared hydraulic calcium aluminate accelerating material.

6. The highly cementitious material comprising considerable proportions of slaked lime and coöperating natural non-pozzuolanic silicious material incorporated with between four and fifteen per cent. of separately prepared hydraulic earthy alkali accelerating compounds rich in alumina-like material.

7. The highly cementitious material comprising considerable proportions of available lime and coöperating natural non-pozzuolanic silicious material incorporated with between two and twenty per cent. of separately prepared hydraulic calcium aluminate accelerating material.

8. The highly cementitious material comprising considerable proportions of slaked lime and coöperating natural argillaceous silicious material incorporated with between two and twenty per cent. of separately prepared hydraulic high alumina calcium aluminate accelerating material.

9. The hydraulic highly cementitious material comprising considerable proportions of available earthy alkali material and coöperating non-pozzuolanic silicious material incorporated with between two and twenty per cent. of separately prepared hydraulic earthy alkali accelerating compounds rich in alumina-like material.

10. The highly cementitious material comprising considerable proportions of available earthy alkali material and coöperating natural argillaceous silicious material incorporated with between two and twenty per cent. of separately prepared hydraulic earthy alkali accelerating compounds rich in alumina-like material.

11. The highly cementitious material comprising considerable proportions of available earthy alkali material and coöperating natural non-pozzuolanic silicious material incorporated with between two and twenty per cent. of separately prepared calcium aluminate accelerating material.

12. The highly cementitious material comprising considerable proportions of earthy alkali material and coöperating natural argillaceous silicious material incorporated with between two and twenty per cent. of separately prepared hydraulic calcium aluminate accelerating material.

13. The highly cementitious material comprising considerable proportions of slaked lime and coöperating natural non-pozzuolanic silicious material incorporated with between two and twenty per cent. of separately prepared hydraulic calcium aluminate accelerating material.

14. The hydraulic highly cementitious material fulfilling the constant volume and sand strength requirements for standard Portland cement comprising considerable proportions of lime and coöperating natural non-pozzuolanic silicious material and comprising a small proportion of incorporated separately prepared hydraulic calcium aluminate accelerating material and calcium sulfate controlling material.

15. The highly cementitious material fulfilling the constant volume and sand strength requirements for standard Portland cement comprising large proportions of earthy alkali material and coöperating natural non-pozzuolanic silicious material and comprising a small proportion of incorporated hydraulic calcium aluminate accelerating material and controlling material.

16. The hydraulic highly cementitious material substantially fulfilling the constant volume requirements for Portland cement comprising large proportions of lime and coöperating natural non-pozzuolanic silicious material and comprising a small proportion of incorporated separately prepared hydraulic calcium aluminate accelerating material.

17. The hydraulic highly cementitious material substantially fulfilling the constant volume and long-period sand strength requirements for Portland cement comprising considerable proportions of earthy alkali material and coöperating natural non-pozzuolanic silicious material and comprising a small proportion of incorporated separately prepared calcium aluminate accelerating material.

18. The hydraulic highly cementitious material fulfilling the constant volume requirements for Portland cement comprising large proportions of lime and coöperating natural argillaceous silicious material and comprising a small proportion of incorporated separately prepared hydraulic earthy alkali accelerating compounds of alumina-like material and controlling material.

19. The hydraulic highly cementitious material substantially fulfilling the constant volume and long-period sand strength requirements for Portland cement comprising considerable proportions of earthy alkali material and coöperate natural non-pozzuolanic silicious material and comprising a small proportion of separately prepared hydraulic earthy alkali accelerating compounds of alumina-like material and controlling material.

20. The hydraulic highly cementitious material substantially fulfilling the constant volume and long-period sand strength requirements for Portland cement comprising large proportions of lime and coöperating natural non-pozzuolanic silicious material and comprising a small proportion of incorporated separately prepared hydraulic earthy alkali accelerating compounds of alumina-like material.

21. The hydraulic highly cementitious material fulfilling the constant volume requirements for Portland cement comprising considerable proportions of earthy alkali material and coöperating natural argillaceous silicious material and comprising a small proportion of separately prepared hydraulic earthy alkali accelerating compounds of alumina-like material.

HENRY S. SPACKMAN.
ELLIS W. LAZELL.

Witnesses:
LOUIS F. SCHUCK,
W. L. WILSON.